(12) United States Patent
Eckstein et al.

(10) Patent No.: US 12,177,205 B2
(45) Date of Patent: Dec. 24, 2024

(54) AUTOMATED, MULTI-CLOUD LIFECYCLE MANAGEMENT OF DIGITAL IDENTITIES OF IOT DATA ORIGINATORS

(71) Applicant: Cisco Technology, Inc., San Jose, CA (US)

(72) Inventors: Daniel Eckstein, Bonn (DE); Robert E. Barton, Richmond (CA); Anthony Pisani, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 312 days.

(21) Appl. No.: 17/722,723

(22) Filed: Apr. 18, 2022

(65) Prior Publication Data
US 2023/0336538 A1 Oct. 19, 2023

(51) Int. Cl.
H04L 9/40 (2022.01)

(52) U.S. Cl.
CPC ...... H04L 63/0823 (2013.01); H04L 63/0876 (2013.01); H04L 63/20 (2013.01)

(58) Field of Classification Search
CPC ............. H04L 63/0823; H04L 63/0876; H04L 63/20
USPC .......................................................... 726/10
See application file for complete search history.

(56) References Cited

U.S. PATENT DOCUMENTS

| | | | | |
|---|---|---|---|---|
| 11,601,288 B1 * | 3/2023 | Bacon | ................... | H04L 63/205 |
| 2011/0289577 A1 * | 11/2011 | Resch | ................. | G06F 11/2094 |
| | | | | 726/10 |
| 2022/0020003 A1 * | 1/2022 | Sarkar | .............. | G06Q 20/38215 |
| 2022/0021665 A1 * | 1/2022 | Barton | .................... | H04L 63/08 |
| 2022/0417035 A1 * | 12/2022 | Guilford | ................. | H04L 63/10 |
| 2023/0239163 A1 * | 7/2023 | Liu | ....................... | H04L 9/0825 |
| | | | | 713/168 |

(Continued)

FOREIGN PATENT DOCUMENTS

| CN | 114422588 A | * | 4/2022 | ......... H04L 63/0807 |
|---|---|---|---|---|
| CN | 115865974 A | * | 3/2023 | |

OTHER PUBLICATIONS

Nohe, Patrick, "The Difference Between Root Certificates and Intermediate Certificates", https://www.thesslstore.com/blog/root-certificates-intermediate/, Jun. 26, 2019, accessed Apr. 7, 2022, 21 pages, The SSL Store.

(Continued)

*Primary Examiner* — Liang Che A Wang
(74) *Attorney, Agent, or Firm* — BEHMKE INNOVATION GROUP LLC; James M. Behmke; James J. Wong (57) ABSTRACT

In one embodiment, an edge device of a network maintains intermediate certificates derived from root certificates of different cloud services that identify the edge device to those different cloud services. The edge device receives identity information for a particular device in the network. The edge device generates, using at least one of its intermediate certificates and the identity information for the particular device, one or more local digital identity certificates for the particular device. The edge device causes the particular device to be onboarded to a target cloud service from among the different cloud services, in part by providing the one or more local digital identity certificates to the particular device and to the target cloud service.

20 Claims, 10 Drawing Sheets

(56) References Cited

U.S. PATENT DOCUMENTS

2023/0336538 A1* 10/2023 Eckstein ............ H04L 63/0876

OTHER PUBLICATIONS

"Device Manufacturing and Provisioning with X.509 Certificates in AWS IoT Core", online: https://d1.awsstatic.com/whitepapers/device-manufacturing-provisioning.pdf, Jan. 2021, accessed Apr. 8, 2022, 24 pages, Amazon Web Services, Inc.

"Proxy Certificates", online: https://docs.openshift.com/container-platform/4.6/security/certificate_types_descriptions/proxy-certificates.html, accessed Apr. 8, 2022, 4 pages, RedHat, Inc.

"Azure Relay Authentication and Authorization", online: https://docs.microsoft.com/en-us/azure/azure-relay/relay-authentication-and-authorization, Jan. 13, 2022, accessed Apr. 8, 2022, 5 pages, Microsoft.

"FIDO Device e Onboard: A specification for automated, secure IoT provisioning technology", online: https://media.fidoalliance.org/wp-content/uploads/2021/04/Introduction-to-FIDO-Device-Onboard-1.pdf, 2021, accessed Apr. 8, 2022, 4 pages, FIDO Alliance.

\* cited by examiner

AUTOMATED, MULTI-CLOUD LIFECYCLE MANAGEMENT OF DIGITAL IDENTITIES OF IOT DATA ORIGINATORS

TECHNICAL FIELD

The present disclosure relates generally to computer networks, and, more particularly, to automated, multi-cloud lifecycle management of digital identities of Internet of Things (IoT) data originators.

BACKGROUND

The Internet of Things, or "IoT" for short, represents an evolution of computer networks that seeks to connect many everyday objects to the Internet. Notably, there has been a recent proliferation of 'smart' devices that are Internet-capable such as thermostats, lighting, televisions, cameras, and the like. In many implementations, these devices may also communicate with one another. For example, an IoT motion sensor may communicate with one or more smart lightbulbs, to actuate the lighting in a room when a person enters the room. Vehicles are another class of 'things' that are being connected via the IoT for purposes of sharing sensor data, implementing self-driving capabilities, monitoring, and the like.

To help manage the ever increasing proliferation and variety of IoT devices, hyperscalar services have evolved, such as Amazon Web Services (AWS) IoT Core, Azure IoT Hub, IBM Watson, and the like. However, onboarding IoT devices to these services is often done on a device-by-device basis. Indeed, as the proliferation and the variety of IoT devices continue to increase, so too will the communication protocols and data structures/models that they use. In addition, different IoT devices deployed to the same area may even need to be onboarded to different services. This makes creating and managing digital identities quite challenging for all of the IoT devices in a given deployment, today.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, an edge device of a network maintains intermediate certificates derived from root certificates of different cloud services that identify the edge device to those different cloud services. The edge device receives identity information for a particular device in the network. The edge device generates, using at least one of its intermediate certificates and the identity information for the particular device, one or more local digital identity certificates for the particular device. The edge device causes the particular device to be onboarded to a target cloud service from among the different cloud services, in part by providing the one or more local digital identity certificates to the particular device and to the target cloud service.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or PLC networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Edge computing, also sometimes referred to as "fog" computing, is a distributed approach of cloud implementation that acts as an intermediate layer from local networks (e.g., IoT networks) to the cloud (e.g., centralized and/or shared resources, as will be understood by those skilled in the art). That is, generally, edge computing entails using devices at the network edge to provide application services, including computation, networking, and storage, to the local nodes in the network, in contrast to cloud-based approaches that rely on remote data centers/cloud environments for the services. To this end, an edge node is a functional node that is deployed close to IoT endpoints to provide computing, storage, and networking resources and services. Multiple edge nodes organized or configured together form an edge compute system, to implement a particular solution. Edge nodes and edge systems can have the same or complementary capabilities, in various implementations. That is, each individual edge node does not have to implement the entire spectrum of capabilities. Instead, the edge capabilities may be distributed across multiple edge nodes and systems, which may collaborate to help each other to provide the desired services. In other words, an edge system can include any number of virtualized services and/or data stores that are spread across the distributed edge nodes. This may include a master-slave configuration, publish-subscribe configuration, or peer-to-peer configuration.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);
2) Links are generally low bandwidth, such that control plane traffic must generally be bounded and negligible compared to the low rate data traffic;
3) There are a number of use cases that require specifying a set of link and node metrics, some of them being dynamic, thus requiring specific smoothing functions to avoid routing instability, considerably draining bandwidth and energy;
4) Constraint-routing may be required by some applications, e.g., to establish routing paths that will avoid non-encrypted links, nodes running low on energy, etc.;
5) Scale of the networks may become very large, e.g., on the order of several thousands to millions of nodes; and
6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid advanced metering infrastructure (AMI), smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

Figure 1:
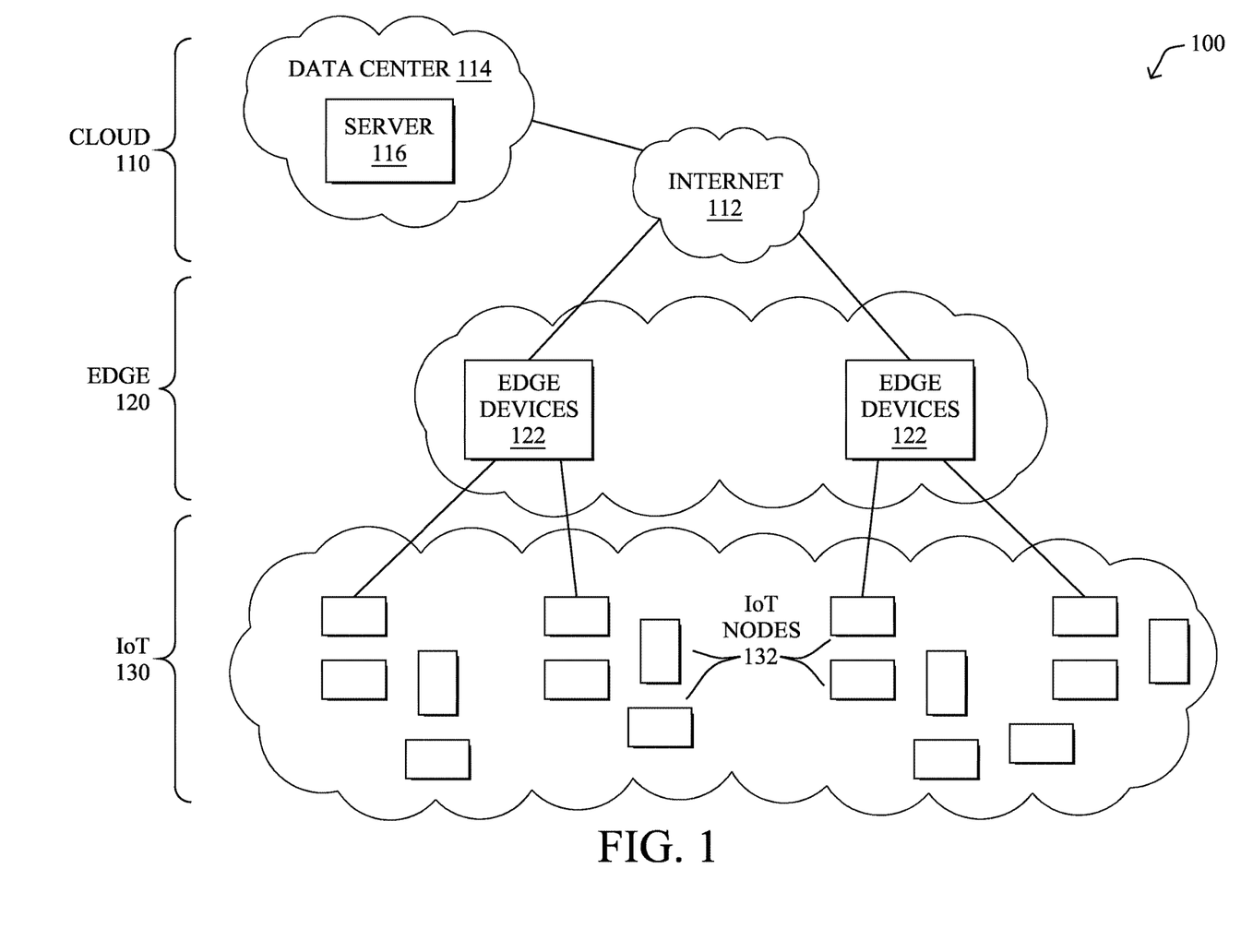
FIG. 1 illustrate an example network.

FIG. 1 is a schematic block diagram of an example simplified computer network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example IoT network 100, three illustrative layers are shown, namely cloud layer 110, edge layer 120, and IoT device layer 130. Illustratively, the cloud layer 110 may comprise general connectivity via the Internet 112, and may contain one or more datacenters 114 with one or more centralized servers 116 or other devices, as will be appreciated by those skilled in the art. Within the edge layer 120, various edge devices 122 may perform various data processing functions locally, as opposed to datacenter/cloud-based servers or on the endpoint IoT nodes 132 themselves of IoT device layer 130. For example, edge devices 122 may include edge routers and/or other networking devices that provide connectivity between cloud layer 110 and IoT device layer 130. Data packets (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Data packets (e.g., traffic and/or messages) may be exchanged among the nodes/devices of the computer network 100 using predefined network communication protocols such as certain known wired protocols, wireless protocols (e.g., IEEE Std. 802.15.4, Wi-Fi, Bluetooth®, DECT-Ultra Low Energy, LoRa, etc.), PLC protocols, or other shared-media protocols where appropriate. In this context, a protocol consists of a set of rules defining how the nodes interact with each other.

Figure 2:
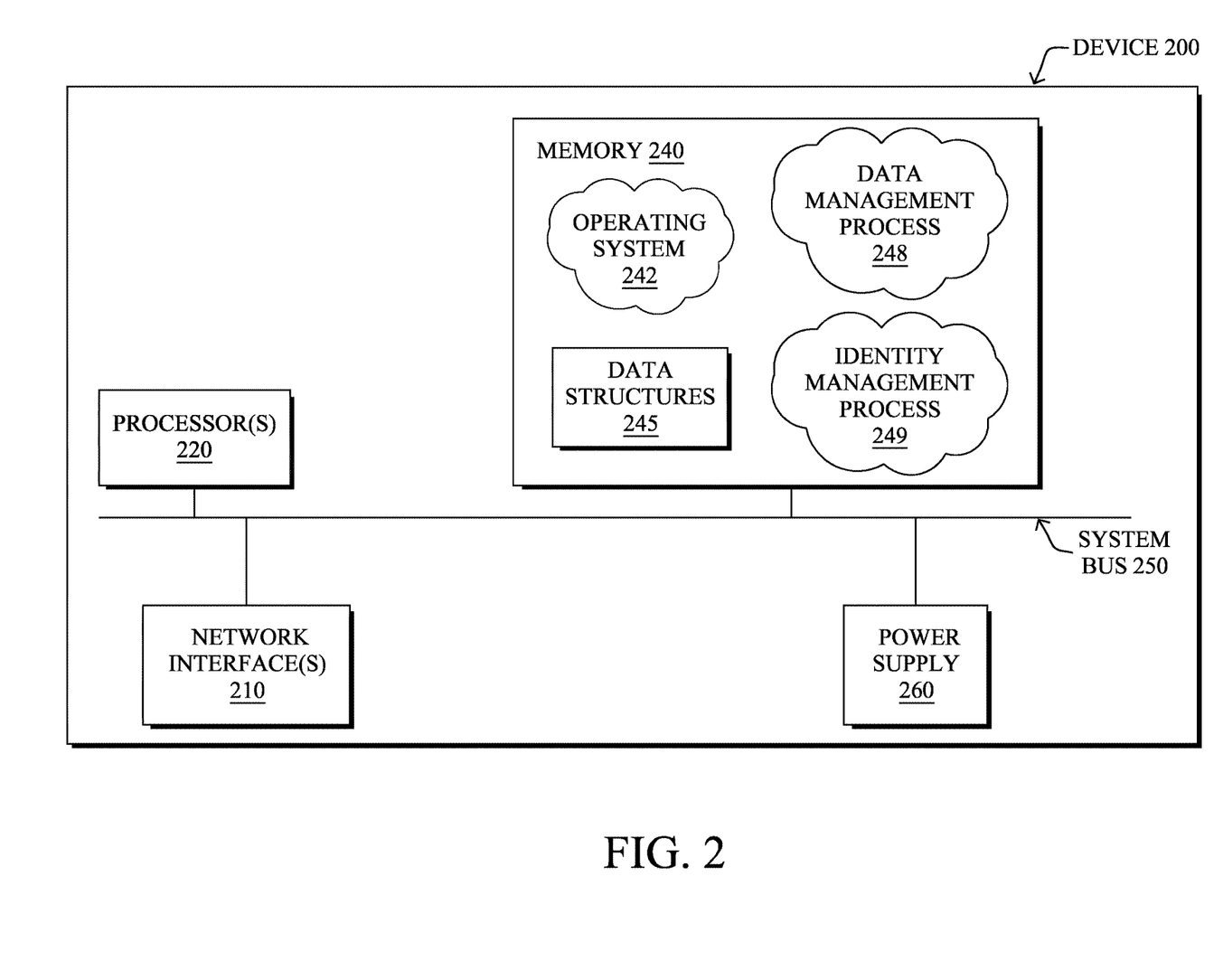
FIG. 2 illustrates an example network device/node.

FIG. 2 is a schematic block diagram of an example node/device 200 that may be used with one or more embodiments described herein, e.g., as any of the nodes or devices shown in FIG. 1 above or described in further detail below. The device 200 may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

Network interface(s) 210 include the mechanical, electrical, and signaling circuitry for communicating data over links coupled to the network. The network interfaces 210 may be configured to transmit and/or receive data using a variety of different communication protocols, such as TCP/IP, UDP, etc. Note that the device 200 may have multiple different types of network connections, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes/services may comprise an illustrative data management process 248 and/or an identity management process 249, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Figure 3:
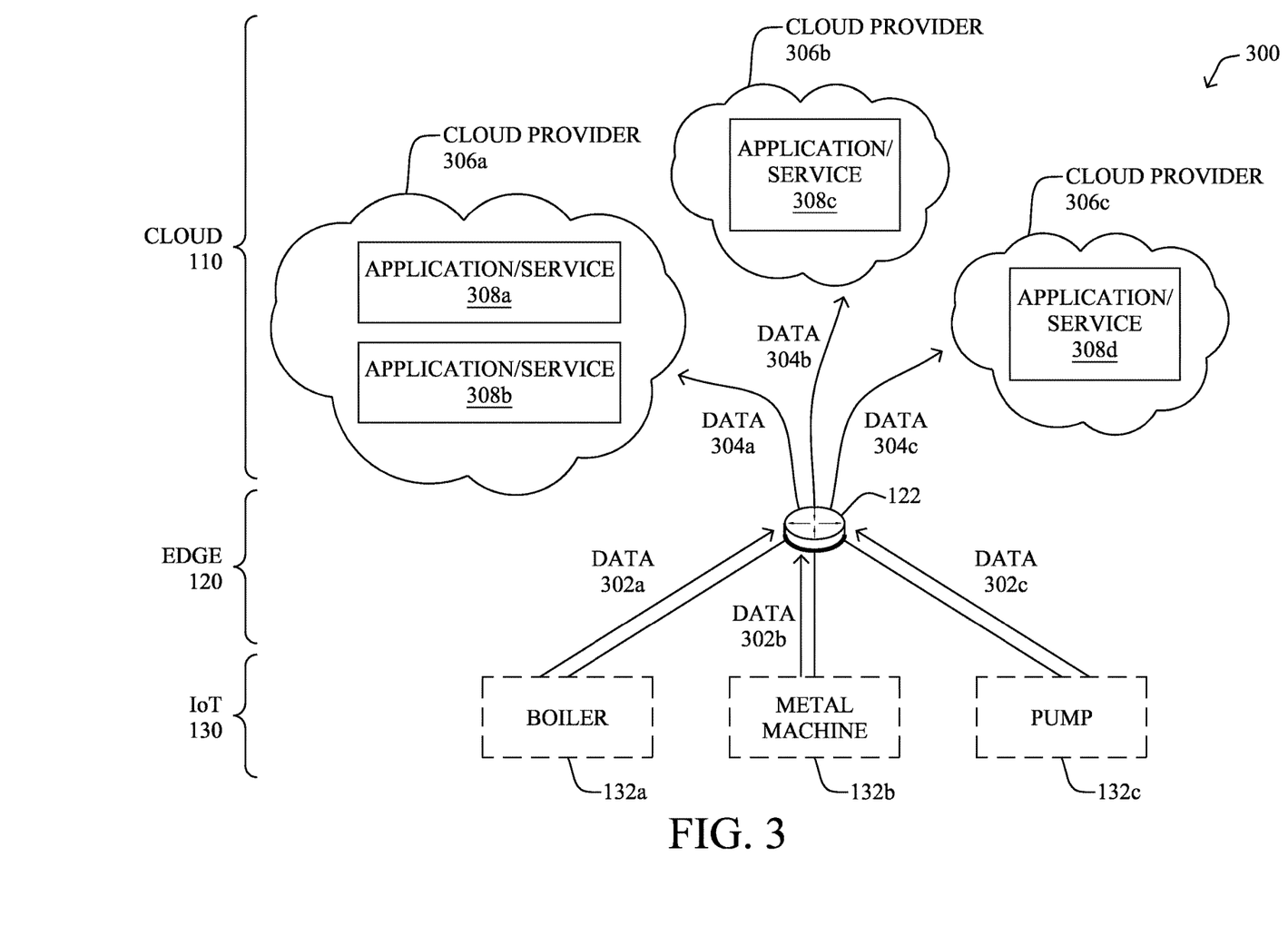
FIG. 3 illustrates an example network architecture for edge to multi-cloud processing and governance.

FIG. 3 illustrates an example network architecture 300 for edge to multi-cloud processing and governance, according to various embodiments. As shown, consider the case of an IoT network at IoT layer 130 that comprises a plurality of nodes 132, such as node 132a (e.g., a boiler), node 132b (e.g., a metal machine), and node 132c (e.g., a pump). Notably, the IoT network at IoT layer 130 may comprise any numbers of sensors and/or actuators. For instance, the network may be located in an industrial setting, such as a factory, port, substation, or the like, a smart city, a stadium, a conference or office building, or any other location in which IoT devices may be deployed.

As the IoT evolves, the variety of IoT devices will continue to grow, as well as the number of applications associated with the IoT devices. As a result, multiple cloud-based applications may take as input measurements or other data generated by a particular IoT device/node. For instance, as shown, assume that IoT nodes 132a-132c generate data 302a-302c, respectively, for consumption by any number of applications/services 308 hosted by different cloud providers 306, such as Microsoft Azure, Software AG, Quantela, MQTT/DC, or the like. For instance, such applications/services 308 may include, but are not limited to, Amazon Web Services (AWS) IoT Core, Azure IoT Hub, IBM Watson, and the like.

To complicate the collection and distribution of data 302a-302c from the various IoT nodes 132, such as nodes 132a-132c shown, the different applications/services 308 may also require different sets of data 304a-304c from data 302a-302c. For instance, assume that cloud provider 306a hosts application/service 308a, which is a monitoring application used by the operator of the IoT network. In addition, cloud provider 306a may also host application/service 308b, which is a developer application that allows the operator of the IoT network to develop and deploy utilities and configurations for the IoT network. In such a case, the relevant IoT nodes 132 may publish sensor readings or other data 302 to an MQTT message broker managed by application/service 308a. Another application/service 308c, may be hosted by an entirely different cloud provider 306b and be used by the vendor or manufacturer of a particular IoT node 132 for purposes. Finally, application/service 308d, may be hosted by a third cloud provider 306c, which is used by technicians for purposes of diagnostics and the like. Of course the number of cloud providers 306 and cloud applications/services 308 may vary considerably, depending on the deployment.

From the standpoint of the edge device 122, such as a router, gateway, switch, or other networking device at the edge of the IoT network, the lack of harmonization between data consumers can lead to overly complicated data access policies, virtual models of IoT nodes 132 (e.g., 'device twins' or 'device shadows') that are often not portable across cloud providers 306, and increased resource consumption. In addition, different IoT nodes may communicate using different protocols within the IoT network. For instance, IoT nodes 132a-132c may communicate using MQTT, Modbus, OPC Unified Architecture (OPC UA), combinations thereof, or other existing communication protocols that are typically used in IoT networks. As a result, the various data pipelines must be configured on an individual basis at edge device 122 and for each of the different combinations of protocols and destination cloud providers 306.

Figure 4:
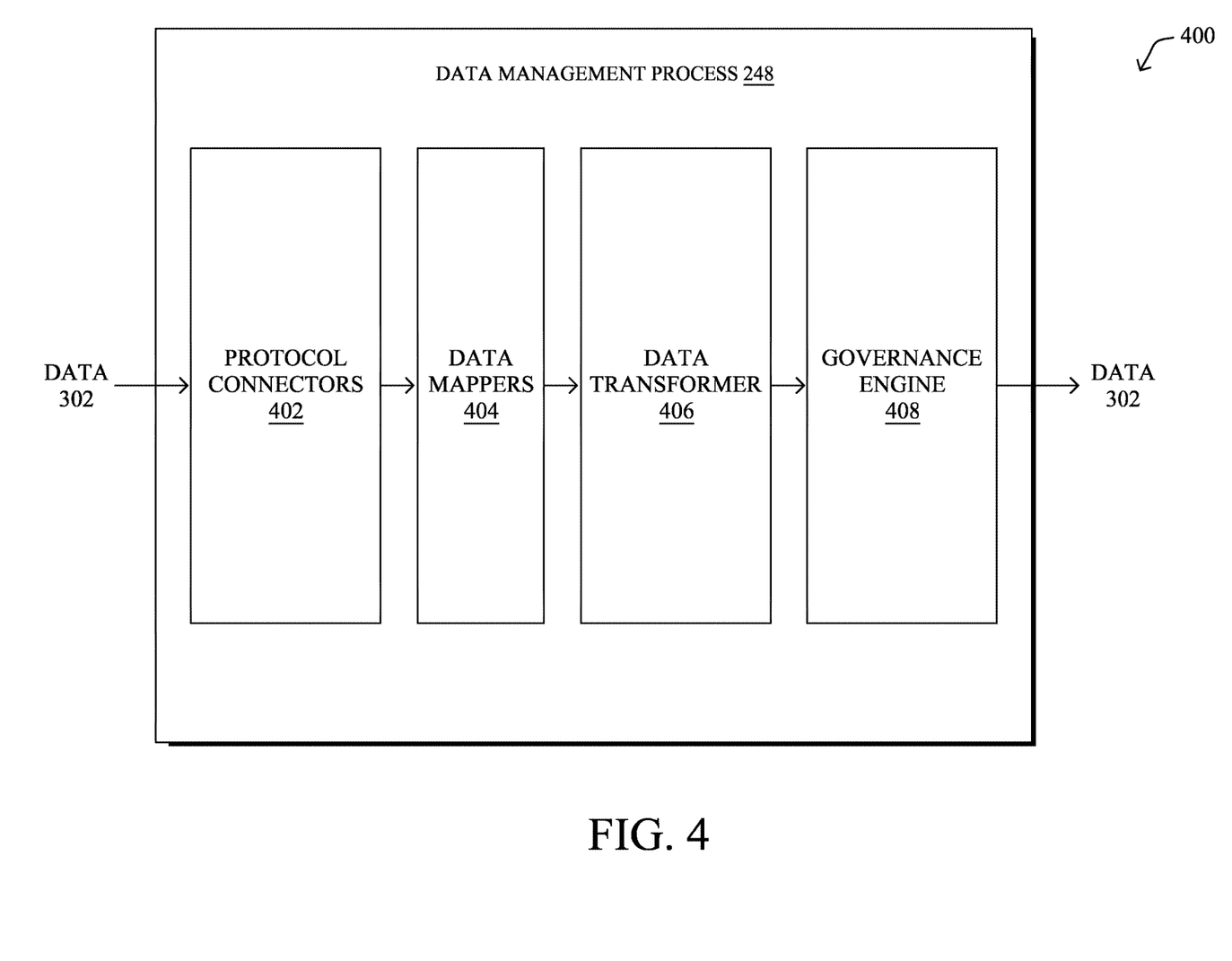
FIG. 4 illustrates an example of data processing by an edge device in a network.

FIG. 4 illustrates an example architecture 400 for data management process 248, according to various embodiments. As shown, data management process 248 may comprise any or all of the following components: a plurality of protocol connectors 402, data mappers 404, a data transformer 406, and/or a governance engine 408. Typically, these components are executed on a single device located at the edge of the IoT network. However, further embodiments provide for these components to be executed in a distributed manner across multiple devices, in which case the combination of devices can be viewed as a singular device for purposes of the teachings herein. Further, functionalities of the components of architecture 400 may also be combined, omitted, or implemented as part of other processes, as desired.

During execution, protocol connectors 402 may comprise a plurality of southbound connectors that are able to extract data 302 from traffic in the IoT network sent via any number of different protocols. For instance, protocol connectors 402 may include connectors for OPC UA, Modbus, Ethernet/IP, MQTT, and the like. Accordingly, when the device executing data management process 248 (e.g., device 200) receives a message from the IoT network, such as a packet, frame, collection thereof, or the like, protocol connectors 402 may process the message using its corresponding connector to extract the corresponding data 302 from the message.

Once data management process 248 has extracted data 302 from a given message using the appropriate connector in protocol connectors 402, data mappers 404 may process the extracted data 302. More specifically, in various embodiments, data mappers 404 may normalize the extracted data 302. Typically, this may entail identifying the data extracted from the traffic in the network as being of a particular data type and grouping the data extracted from the traffic in the network with other data of the particular data type. In some instances, this may also entail associating a unit of measure with the extracted data 302 and/or converting a data value in one unit of measure to that of another.

In various embodiments, once data 302 has been extracted and normalized, data transformer 406 may apply any number of data transformation to the data. In some embodiments, data transformer 406 may transform data 302 by applying any number of mathematical and/or symbolic operations to it. For instance, data transformer 406 may apply a data compression or data reduction to the extracted and normalized data 302, so as to summarize or reduce the volume of data transmitted to the cloud. To do so, data transformer 406 may sample data 302 over time, compute statistics regarding data 302 (e.g., its mean, median, moving average, etc.), apply a compression algorithm to data 302, combinations thereof, or the like.

In further embodiments, data transformer 406 may apply analytics to the extracted and normalized data 302, so as to transform the data into a different representation, such as an alert or other indication. For instance, data transformer 406 may apply simple heuristics and/or thresholds to data 302, to transform data 302 into an alert. In another embodiment, data transformer 406 may apply machine learning to data 302, to transform the data.

In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

Data transformer 406 may employ one or more supervised, unsupervised, or semi-supervised machine learning models. Generally, supervised learning entails the use of a training set of data that is used to train the model to apply labels to the input data. For example, the training data may include samples of 'good' readings or operations and 'bad' readings or operations that are labeled as such. On the other end of the spectrum are unsupervised techniques that do not require a training set of labels. Notably, while a supervised learning model may look for previously seen patterns that have been labeled as such, an unsupervised model may instead look to whether there are sudden changes in the behavior. For instance, an unsupervised model may Semi-supervised learning models take a middle ground approach that uses a greatly reduced set of labeled training data.

Example machine learning techniques that data transformer 406 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) ANNs (e.g., for non-linear models), replicating reservoir networks (e.g., for non-linear models, typically for time series), random forest classification, deep learning models, or the like.

In further embodiments, data transformer 406 may comprise a scripting engine that allows developers to deploy any number of scripts to be applied to data 302 for purposes of the functionalities described above. For instance, an application developer may interface with application/service 308b shown previously in FIG. 3, to develop and push various scripts for execution by data transformer 406, if allowed to do so by policy. In other cases, previously developed scripts may also be pre-loaded into data transformer 406 and/or made available by the vendor or manufacturer of the device executing data management process 248 for deployment to data transformer 406.

According to various embodiments, another potential component of data management process 248 is governance engine 408 that is responsible for sending the data 302 transformed by data transformer 406 to any number of cloud providers as data 304. In general, governance engine 408 may control the sending of data 304 according to a policy. For instance, governance engine 408 may apply a policy that specifies that data 304 may be sent to a particular cloud provider and/or cloud-based application, but should not be sent to others. In some embodiments, the policy enforced by governance engine 408 may control the sending of data 304 on a per-value or per-data type basis. For instance, consider the case of an IoT node reporting a temperature reading and pressure reading. In such a case, governance engine 408 may send the temperature reading to a particular cloud provider as data 304 while restricting the sending of the pressure reading, according to policy.

As would be appreciated, by unifying the policy enforcement via governance engine 408, the various stakeholders in the data pipelines are able to participate in the creation and maintenance of the enforced policies. Today, the various data pipelines built to support the different network protocols and cloud vendors results in a disparate patchwork of policies that require a level of expertise that not every participant may possess. In contrast, by unifying the policy enforcement via governance engine 408, personnel such as security experts, data compliance representatives, technicians, developers, and the like can participate in the administration of the policies enforced by governance engine 408.

As noted above, while an edge device may help facilitate the transfer of data 302 from the IoT nodes/devices in its network, potentially after performing various processing to form data 304 for sending, this functionality is still contingent on the source IoT nodes/devices being onboarded to the various cloud applications/services to which the data is to be sent. However, in typical IoT deployments, the number and variety of data originators varies significantly. This is true not only for the different types of data originators (e.g., IoT nodes/devices generating the data), as well as the exposed data structures (data models), but also for the industrial and communication protocols in use.

Thus, there are multiple challenges to efficiently move data 302 from the source IoT nodes/devices to cloud services such as AWS IoT Core, Azure IoT Hub, IBM Watson, etc. These may include, for instance, any or all of the following:

Onboarding each IoT node individually to its corresponding cloud application(s)/service(s) on an individual basis can be difficult and slow, due to the large number of IoT nodes in a typical network. This number is also typically elastic and positively trending in any given deployment.

It is of utter importance to assign a digital identity to every data originator/IoT node and maintain the relation between an originator and its digital identity throughout the time during which data is being acquired from this data originator.

Management of digital entities can be quite cumbersome in many IoT networks.

It is increasingly common for an IoT node to be onboarded to multiple cloud services, requiring provisioning for each potential destination, manually.

Automated Multi-Cloud Lifestyle Management of Digital Identities of IoT Data Originators The techniques introduced herein allow the automatic management of digital identities for IoT data originators (i.e., nodes in an IoT network), to facilitate onboarding of those devices to multiple cloud services. In some aspects, the digital identities may be managed according to policy and in a secure manner, while still being able to scale. In further aspects, the techniques introduced herein also are agnostic as to the target services, without being locked into a single vendor, as well as allowing the network operator to pick specific services from different cloud vendors for use.

Illustratively, the techniques described herein may be performed by hardware, software, and/or firmware, such as in accordance with identity management process 249, which may include computer executable instructions executed by the processor 220 (or independent processor of interfaces 210) to perform functions relating to the techniques described herein and potentially in conjunction with that of data management process 248.

Specifically, according to various embodiments, an edge device of a network maintains intermediate certificates derived from root certificates of different cloud services that identify the edge device to those different cloud services. The edge device receives identity information for a particular device in the network. The edge device generates, using at least one of its intermediate certificates and the identity information for the particular device, one or more local digital identity certificates for the particular device. The edge device causes the particular device to be onboarded to a target cloud service from among the different cloud services, in part by providing the one or more local digital identity certificates to the particular device and to the target cloud service.

Operationally, FIGS. 5A-5E illustrate an example 500 of the management of digital identities to onboard a device to a cloud service, according to various embodiments. Continuing the example shown previously in FIG. 3, assume that IoT nodes 132a-132c are being deployed in the local IoT network that has edge device 122 at its edge. In various embodiments, the techniques herein propose edge device 122 aiding in the establishment and management of digital identities for IoT nodes 132a-132c for use with the cloud applications/services 308 to which they need to communicate. For simplicity, only two cloud application/services are shown: application/service 308a hosted by cloud provider 306a and application/service 308c hosted by cloud provider 306b. However, the techniques herein can be used to manage the digital identities for IoT 132a-132c across any number of cloud providers 306 and cloud application/services 308.

Figure 5A:
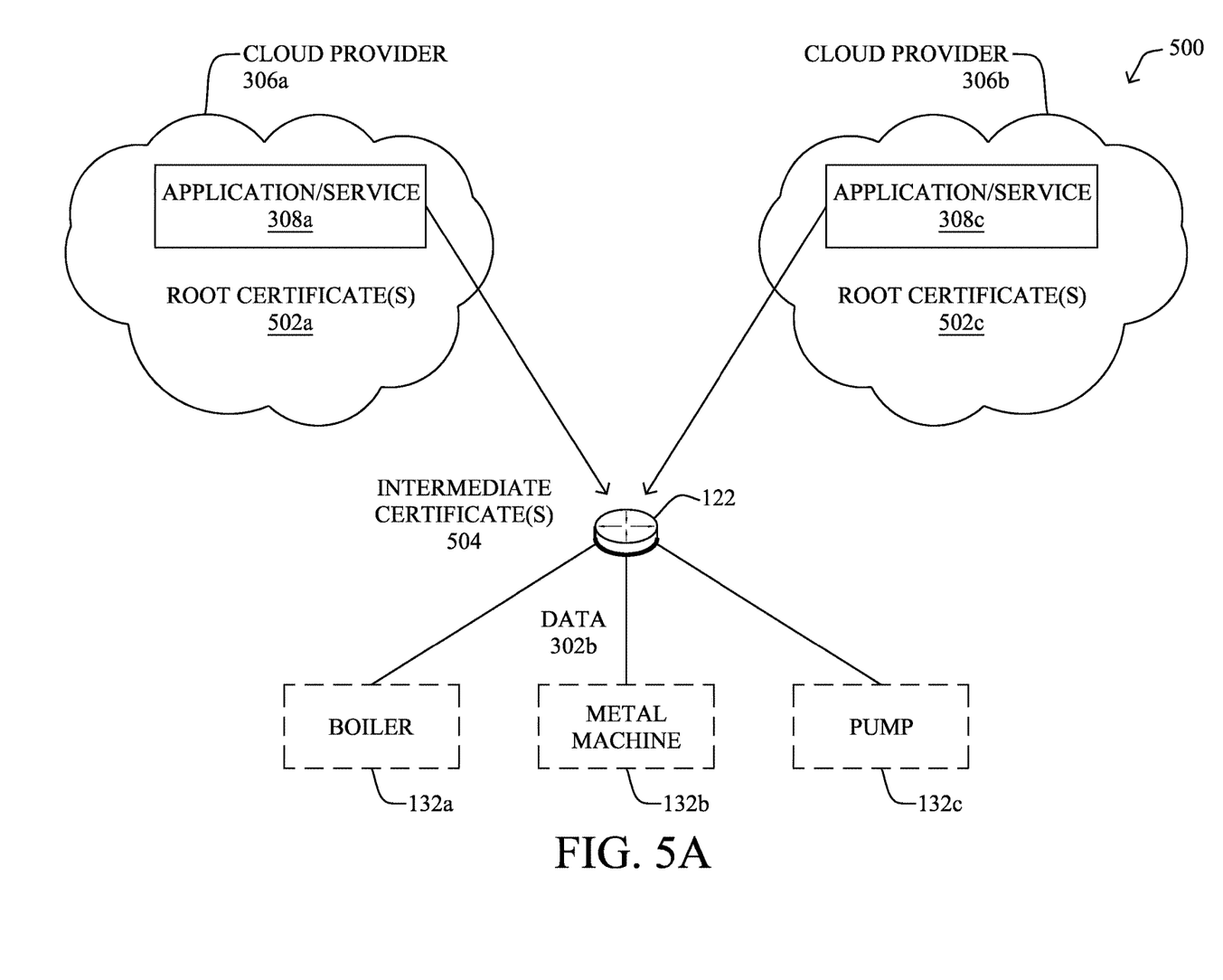
FIGS. 5A-5E illustrate an example of the management of digital identities to onboard a device to a cloud service.

As shown in FIG. 5A, a prerequisite for the techniques herein may be the establishment of a trust relationship between edge device 122 and application/service service 308a and application/service 308c. This can be done, for instance, by leveraging a public key infrastructure (PKI) mechanism or other cryptographic mechanism that allows edge device 122 to authenticate itself to application/service 308a and application/service 308c, and vice-versa.

According to various embodiments, each of application/services 308 may have its own root certificate(s) 502 from which intermediate certificate(s) 504 may be derived and maintained by edge device 122. To do so, root certificate(s) 502 may be used to sign intermediate certificate(s) 504, thereby allowing the corresponding application/service 308 to verify the identity of edge device 122. Note that there may also be multiple intermediate certificates 504 per trust relationship to a cloud backend, as well. Associated with intermediate certificate(s) 504 may also be information regarding the identity of edge device 122, such as its location, owner or operator, use case, group of data originators/IoT nodes, or the like.

Figure 5B:
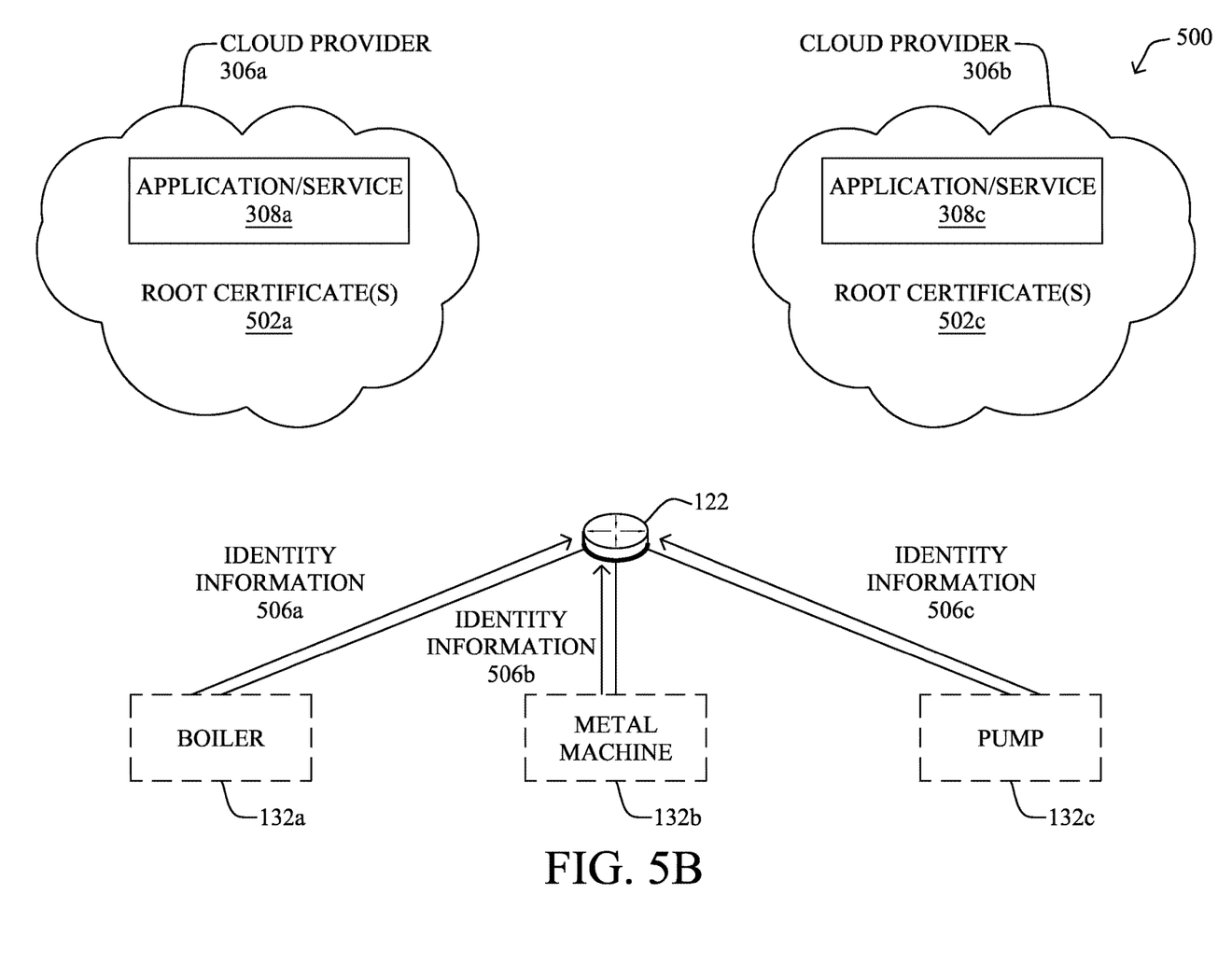

As shown in FIG. 5B, edge device 122 may also obtain identity information 506a-506c regarding the IoT nodes 132a-132c, respectively. This can be done either directly, such as by receiving identification messages from them, by leveraging a network inventory service that discovers them on the local network, information from a third party source or network administrator, or the like. Generally, identity information 506 includes information regarding its corresponding IoT node 132, such as its manufacturer, model, device type, location in the local network, media access control (MAC) address or other identifier, manually specified information, or the like.

In various embodiments, edge device 122 may use identity information 506 to determine the data pipeline(s) and policies for that IoT node 132. For instance, based on identity information 506a regarding IoT node 132a, edge device 122 may determine that data from IoT node 132a should be sent to application/service 308a, as well as to application/service 308c, which of the data should be sent to which services, any data transformations that edge device 122 should perform on the data, any governing policies, etc.

Figure 5C:
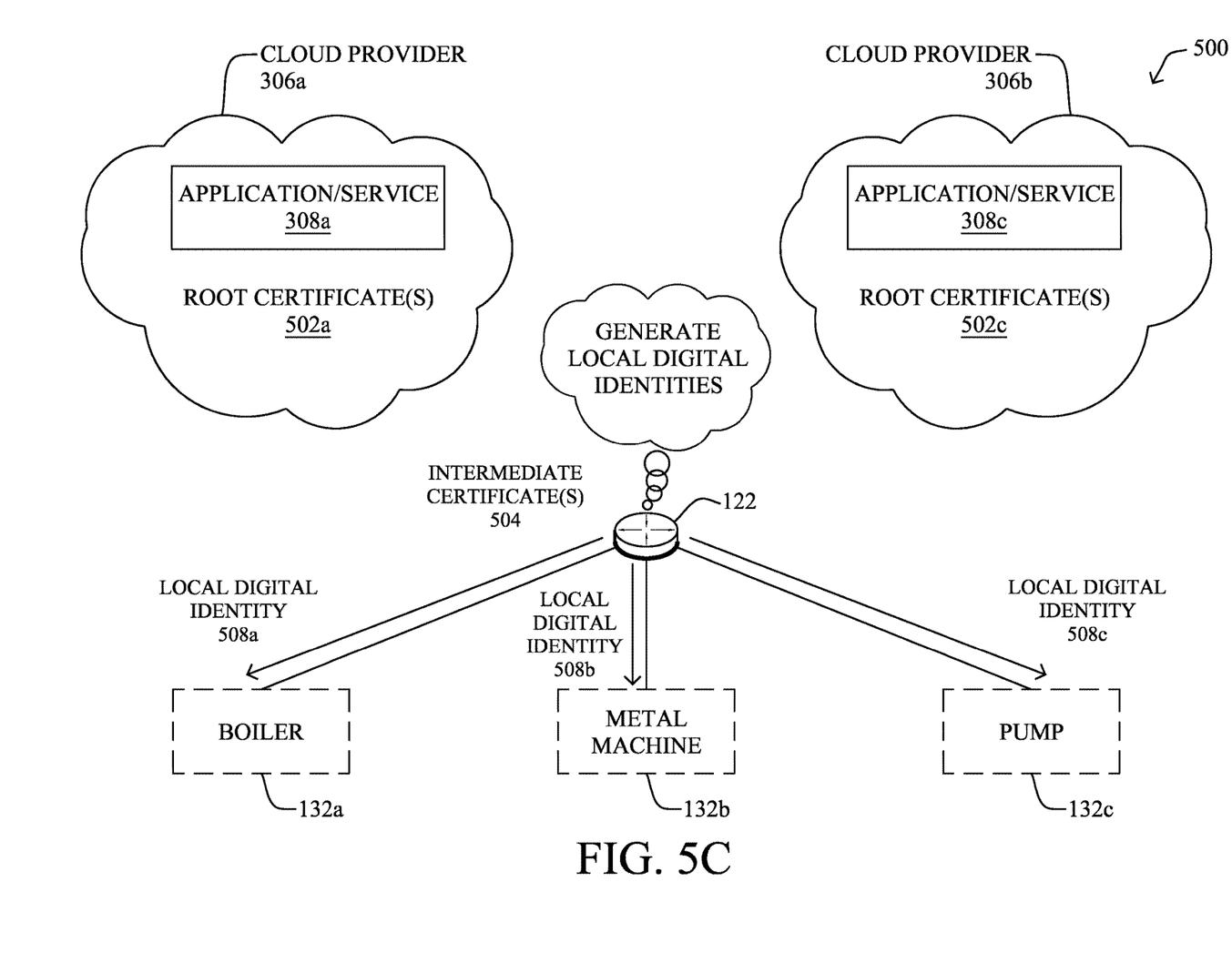

As shown in FIG. 5C, for any of the cloud applications/services 308 to which a given IoT node 132 needs to be onboarded, edge device 122 may create a local digital identity 508 for that IoT node 132, in various embodiments. In some embodiments, edge device 122 may do so by signing certificates for the IoT node 132 using its intermediate certificate(s) 504 associated with those target cloud application(s)/service(s) 308. For instance, say IoT node 132b is to send its data to application/service 308a, as well as to application/service 308c, based on its identity information 506b. In such a case, edge device 122 may use its intermediate certificate(s) 504 associated with those respective services to create and issue new certificates to IoT node 132b that function as its local digital identity 508b. Edge device 122 may perform similar operations with respect to IoT node 132a and IoT node 132c, as well, based on their respective identity information 506 and the cloud application(s)/service(s) 308 to which they are to send data.

Figure 5D:
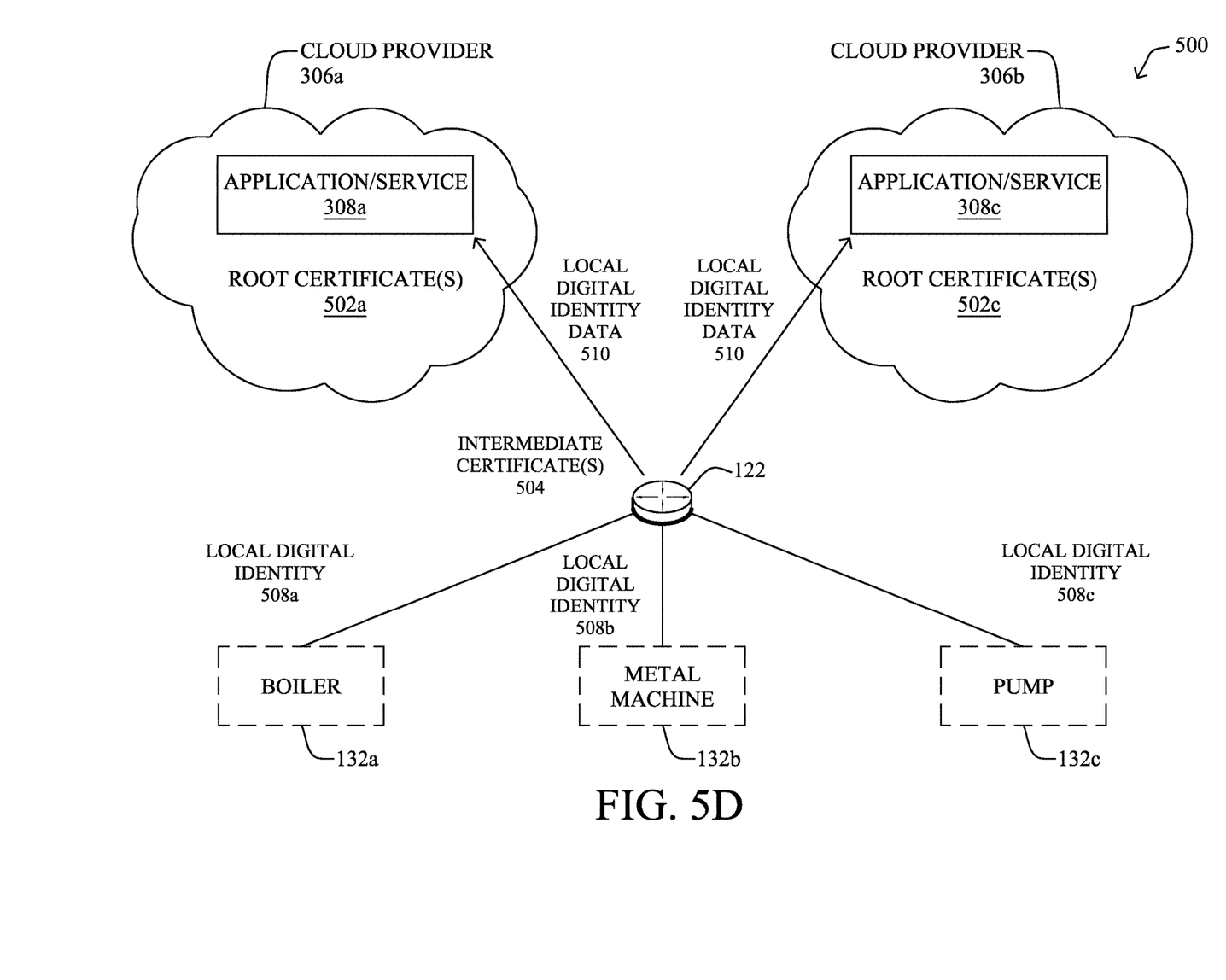

In FIG. 5D, edge device 122 may also cause the IoT nodes 132 to be onboarded to their target cloud applications/services 308, in various embodiments. In some embodiments, edge device 122 may do so directly, such as by providing its resulting local digital identity data 510 for them to their target applications/services 308. For instance, edge device 122 may provide local digital identity data 510 via application programming interfaces (APIs), or the like, to automatically onboard IoT nodes 132 to their respective applications/services 308. Such local digital identity data 510 may include, for instance, the local digital identity certificates generated by edge device 122 for IoT nodes 132a-132c, associated information based on the identity information 506 for those nodes (e.g., their locations, types, etc.), other information derived therefrom, or the like. In turn, the receiving application/service 308 may provision the requisite resources to begin receiving data from those IoT nodes 132.

Figure 5E:
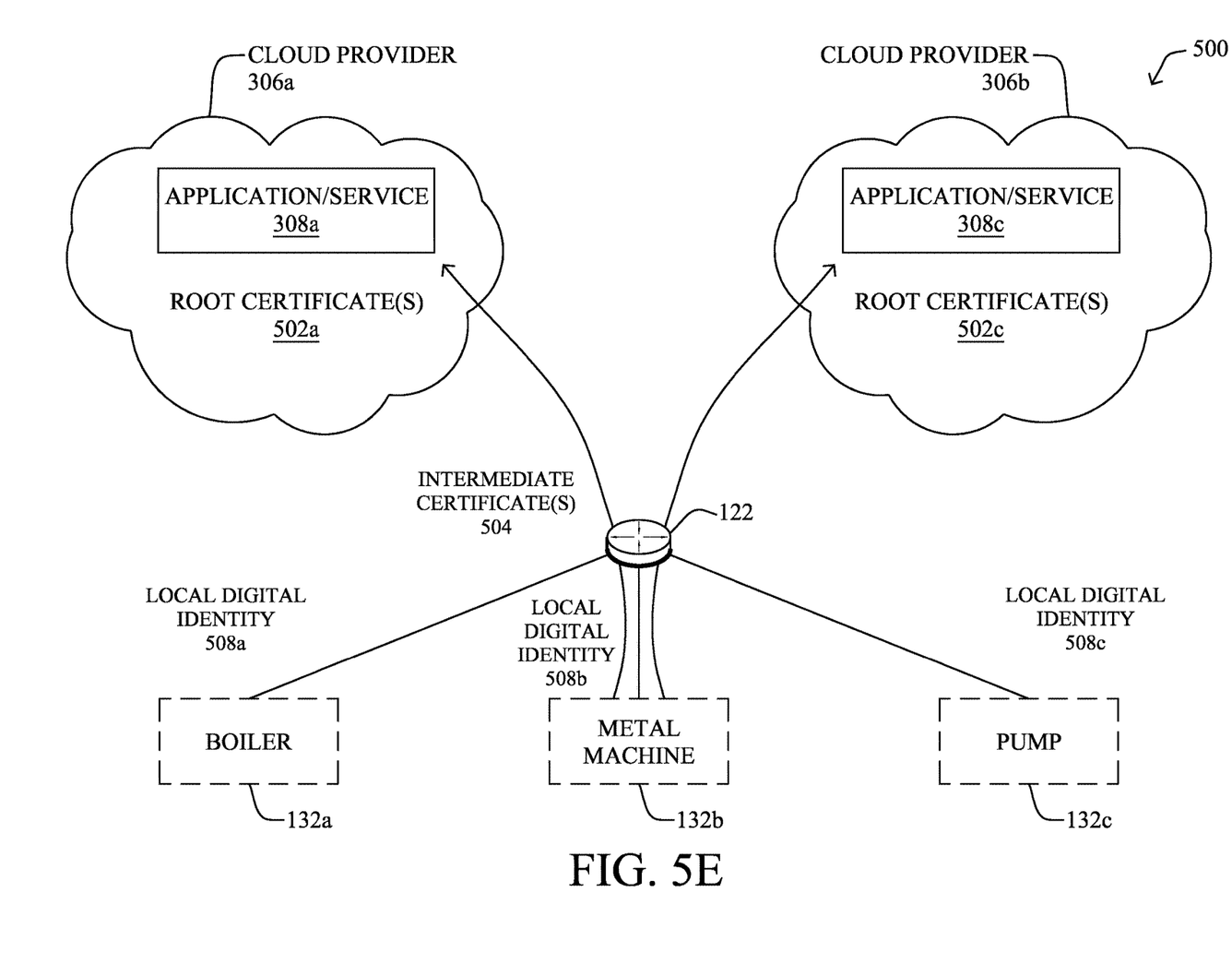

FIG. 5E illustrates the case in which IoT node 132b has now been onboarded to service 308a and to service 308c. Once edge device 122 has shared the its local digital identity data 510 for IoT node 132b with those services, thereby onboarding IoT node 132b to those services, IoT node 132b may identify itself to them using its local digital identity 508b, when sending its data to them. For instance, IoT node 132b may use its local digital identity certificate(s) to sign its data, thereby proving that it is indeed the same device registered by edge device 122 to those services. Since its local certificate(s) were signed by edge device 122 using its own intermediate certificate(s) 504, which were derived from the root certificate(s) 502 of the cloud services, this effectively forms a chain of trust between the IoT nodes 132 and the cloud applications/services 308.

Thus, edge device 122 may function as a digital identity creator and mediator between an IoT node 132 and a cloud service 308, with the ability to share this information with multiple upstream cloud backends and potentially simultaneously, as well (e.g., according to its defined policies). In other words, as IoT nodes 132 are onboarded to edge device 122, they are also automatically given a local digital identity based on their profiles. These identities are then shared and onboarded into the backend cloud service(s). For example, if 1,000 programmable logic controllers are onboarded by edge device 122 at a factory location, edge device 122 may give each of them a local digital identity (e.g., creates certificates for them using its intermediate certificates), and share this identity information with their intended target cloud services. In doing so, those cloud services are then able to begin receiving and processing data from them, according to their profiles.

In further embodiments, edge device 122 may also simplify the revocation of local digital identities 508, as well. For instance, say IoT node 132a is being replaced in the factory or that the factory owner no longer wishes to use applications/services 308a, 308c. In such a case, edge device 122 could simply revoke its local certificate and/or notify the applications/services 308 associated with IoT node 132a of the revocation. Doing so will effectively remove the ability of IoT node 132a to provision data for those services.

Note also that the management of the digital identities by edge device 122 allows for the dynamic adjustment of the cloud application(s)/service(s) for a given IoT node 132, or a set thereof, even after their initial onboarding. For instance, say the operator of the network in which IoT nodes 132 are located now wishes to use a different cloud application/service from a different cloud vendor. In such a case, edge device 122 may utilize the techniques herein to onboard those IoT nodes 132 to the new application/service in an automated manner.

Figure 6:
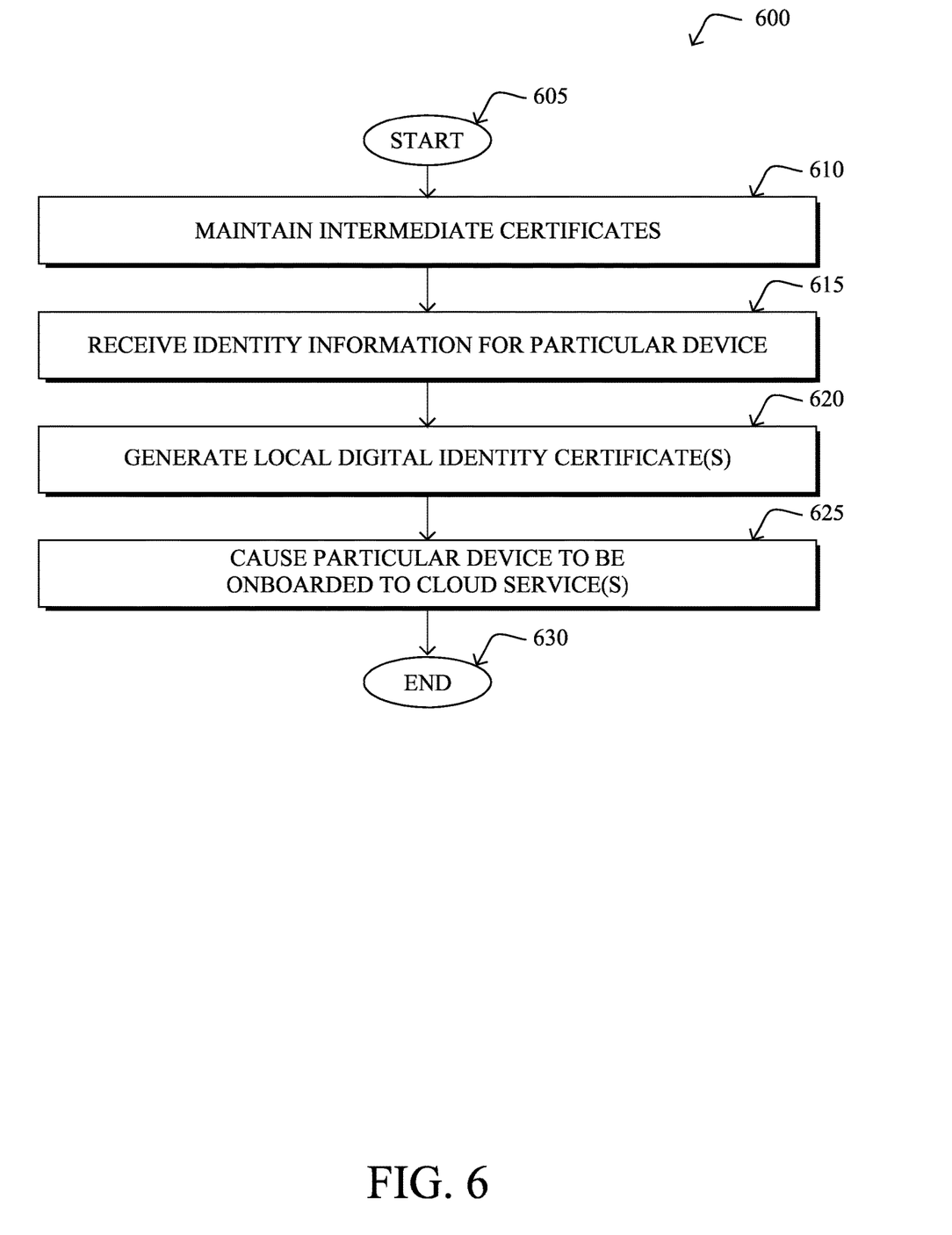
FIG. 6 illustrates an example simplified procedure for the automated, multi-cloud lifecycle management of digital identities of Internet of Things (IoT) data originators.

FIG. 6 illustrates an example simplified procedure for the automated, multi-cloud lifecycle management of digital identities of IoT data originators, in accordance with one or more embodiments described herein. The procedure 600 may start at step 605, and continues to step 610, where, as described in greater detail above, a specifically configured edge device (e.g., a device 200) may maintain intermediate certificates derived from root certificates of different cloud services that identify the edge device to those different cloud services. In various embodiments, the edge device may also establish trust relationships with the different cloud services. In other embodiments, the edge device may comprise a network router or a network switch.

At step 615, as detailed above, the edge device may receive identity information for a particular device in the network. In some embodiments, the identity information for the particular device identifies a type or manufacturer of the particular device. In one embodiment, the edge device may determine, based in part on the identity information for the particular device, that the particular device should be onboarded to the target cloud service.

At step 620, the edge device may generate, using at least one of its intermediate certificates and the identity information for the particular device, one or more local digital identity certificates for the particular device, as described in greater detail above. For instance, the edge device may use its intermediate certificates for those cloud service(s) to which the particular device is to be onboarded, to sign the local digital identity certificates for the particular device, thereby creating a certificate chain of trust between those cloud service(s), the edge device, and the particular device.

At step 625, as detailed above, the edge device may cause the particular device to be onboarded to a target cloud service from among the different cloud services, in part by providing the one or more local digital identity certificates to the particular device and to the target cloud service. In some embodiments, the particular device uses the one or more local digital identity certificates to identify itself to the target cloud service. In another embodiment, the edge device may also send data from the particular device to the target cloud service, after the particular device has been onboarded to the target cloud service. In an additional embodiment, the edge device may transform the data from the particular device, prior to sending it to the target cloud service. In yet another embodiment, the target cloud service may comprise an MQTT message broker.

In further embodiments, the edge device may cause the particular device to be onboarded to a second cloud service from among the different cloud services, in part by providing the one or more local digital identity certificates to the particular device and to the second cloud service. Of course, the edge device could also cause the particular device to be onboarded to other cloud services, as well, and potentially in parallel with that of the target and second cloud services. Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for the automated management of digital identities (e.g., certificates) of IoT nodes, to facilitate the onboarding and management of those nodes across any number of cloud services.

While there have been shown and described illustrative embodiments for the automated, multi-cloud lifecycle management of digital identities of IoT data originators, it is to be understood that various other adaptations and modifications may be made within the intent and scope of the embodiments herein. For example, while specific protocols are used herein for illustrative purposes, other protocols and protocol connectors could be used with the techniques herein, as desired. Further, while the techniques herein are described as being performed by certain locations within a network, the techniques herein could also be performed at other locations, such as at one or more locations fully within the local network, etc.).

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method comprising:
   maintaining, by an edge device of a network, intermediate certificates derived from root certificates of different cloud services, wherein the intermediate certificates identify the edge device to the different cloud services;
   receiving, at the edge device, identity information for a particular device in the network;
   generating, by the edge device and using at least one of the intermediate certificates and the identity information for the particular device, one or more local digital identity certificates for the particular device; and
   causing, by the edge device, the particular device to be onboarded to a target cloud service from among the different cloud services, in part by providing the one or more local digital identity certificates to the particular device and to the target cloud service.

2. The method as in claim 1, wherein the particular device uses the one or more local digital identity certificates to identify the particular device to the target cloud service.

3. The method as in claim 1, wherein the identity information for the particular device identifies a type or manufacturer of the particular device.

4. The method as in claim 1, further comprising:
   causing, by the edge device, the particular device to be onboarded to a second cloud service from among the different cloud services, in part by providing the one or more local digital identity certificates to the particular device and to the second cloud service.

5. The method as in claim 1, further comprising:
   establishing, by the edge device, trust relationships with the different cloud services.

6. The method as in claim 1, further comprising:
   sending, by the edge device, data from the particular device to the target cloud service, after the particular device has been onboarded to the target cloud service.

7. The method as in claim 6, further comprising:
   transforming, by the edge device, the data from the particular device, prior to sending the data to the target cloud service.

8. The method as in claim 1, further comprising:
   determining, by the edge device and based in part on the identity information for the particular device, that the particular device should be onboarded to the target cloud service.

9. The method as in claim 1, wherein the target cloud service comprises an MQTT message broker.

10. The method as in claim 1, wherein the edge device comprises a network router or a network switch.

11. An apparatus, comprising:
    one or more network interfaces;
    a processor coupled to the one or more network interfaces and configured to execute one or more processes; and
    a memory configured to store a process that is executable by the processor, the process when executed configured to:
       maintain intermediate certificates derived from root certificates of different cloud services, wherein the intermediate certificates identify the apparatus to the different cloud services;
       receive identity information for a particular device;
       generate, using at least one of the intermediate certificates and the identity information for the particular device, one or more local digital identity certificates for the particular device; and
       cause the particular device to be onboarded to a target cloud service from among the different cloud services, in part by providing the one or more local digital identity certificates to the particular device and to the target cloud service.

12. The apparatus as in claim 11, wherein the particular device uses the one or more local digital identity certificates to identify the particular device to the target cloud service.

13. The apparatus as in claim 11, wherein the identity information for the particular device identifies a type or manufacturer of the particular device.

14. The apparatus as in claim 11, wherein the process when executed is further configured to:
    cause the particular device to be onboarded to a second cloud service from among the different cloud services, in part by providing the one or more local digital identity certificates to the particular device and to the second cloud service.

15. The apparatus as in claim 11, wherein the process when executed is further configured to:
    establish trust relationships with the different cloud services.

16. The apparatus as in claim 11, wherein the process when executed is further configured to:
    send data from the particular device to the target cloud service, after the particular device has been onboarded to the target cloud service.

17. The apparatus as in claim 16, wherein the process when executed is further configured to:
    transform the data from the particular device, prior to sending the data to the target cloud service.

18. The apparatus as in claim 11, wherein the process when executed is further configured to:
    determine, based in part on the identity information for the particular device, that the particular device should be onboarded to the target cloud service.

19. The apparatus as in claim 11, wherein the target cloud service comprises an MQTT message broker.

20. A tangible, non-transitory, computer-readable medium storing program instructions that cause an edge device of a network, to execute a process comprising:
- maintaining, by the edge device, intermediate certificates derived from root certificates of different cloud services, wherein the intermediate certificates identify the edge device to the different cloud services;
- receiving, at the edge device, identity information for a particular device in the network;
- generating, by the edge device and using at least one of the intermediate certificates and the identity information for the particular device, one or more local digital identity certificates for the particular device; and
- causing, by the edge device, the particular device to be onboarded to a target cloud service from among the different cloud services, in part by providing the one or more local digital identity certificates to the particular device and to the target cloud service.

* * * * *